United States Patent [19]
Sun et al.

[11] Patent Number: 5,845,153
[45] Date of Patent: Dec. 1, 1998

[54] MEMORY INTERFACE FOR ASYNCHRONOUS TRANSFER MODE SEGMENTATION AND REASSEMBLY CIRCUIT

[75] Inventors: Chih-Ping Sun, San Jose; Joseph P. Chiang, Cupertino, both of Calif.

[73] Assignee: Integrated Device Technology, Inc., Santa Clara, Calif.

[21] Appl. No.: 499,799

[22] Filed: Jul. 7, 1995

[51] Int. Cl.⁶ .................................................. G06F 13/00
[52] U.S. Cl. .......................... 395/876; 370/474; 370/395
[58] Field of Search ................................. 395/250, 876, 395/872; 370/474, 395

[56] References Cited

U.S. PATENT DOCUMENTS

| | | | |
|---|---|---|---|
| 5,295,246 | 3/1994 | Bischoff et al. | 395/854 |
| 5,379,297 | 1/1995 | Glover et al. | 370/234 |
| 5,412,781 | 5/1995 | Lukas et al. | 395/876 |
| 5,606,559 | 2/1997 | Badger et al. | 370/395 |
| 5,768,275 | 6/1998 | Lincoln et al. | 370/419 |

OTHER PUBLICATIONS

Tomimitsu et al.; An ATM Chip Set for High Performance Computer Interfaces, Affording Over 100Mbp Sustained Throughput; IEEE 1995 Custom Integrated Circuits Conference; Feb. 1995; pp. 439–442.

*Primary Examiner*—Parshotam S. Lall
*Assistant Examiner*—Kenneth R. Coulter
*Attorney, Agent, or Firm*—Skjerven,Morrill, MacPherson,Franklin & Friel

[57] ABSTRACT

An asynchronous transfer mode (ATM) segmentation and reassembly (SAR) circuit uses a memory map which accommodates a variety of memory sizes. The SAR circuit generates address signals according to the memory map which is independent of memory size. The most significant bits (MSBs) of the address are ignored for memories having fewer address terminals than the SAR circuit. The memory map allocates N-bit addresses to buffers and an expansion area. A first buffer has addresses with i+1 MSBs set to 1 and a second buffer has addresses with i+1 MSBs set to 0. i MSBs can be ignored without causing address conflicts because an address for the first buffer has at least one bit that differs from a corresponding bit in an address for the second buffer. The first and second buffers expand, as required, into the expansion area between the buffer. For an application using the smallest memory, conflicts do not occur because the first and second buffers are sufficient for the minimum memory applications. Typically, buffers adjacent the expansion area contain information describing channels of an ATM network and expand into the expansion area if the network has more than a predetermined number of channels.

7 Claims, 3 Drawing Sheets

MEMORY INTERFACE FOR ASYNCHRONOUS TRANSFER MODE SEGMENTATION AND REASSEMBLY CIRCUIT

BACKGROUND OF THE INVENTION

1. Field of the Invention

This invention relates to memory interfaces and memory maps usable with memories having different sizes, and in particular to memory interfaces for an asynchronous transfer mode segmentation and reassembly circuit.

2. Description of Related Art

Asynchronous Transfer Mode (ATM) with Segmentation and Reassembly (SAR) provides a method for transmitting messages over a network and is described in "ATM User-Network Interface Specification" Version 3.0 which is incorporated by reference herein in its entirety. According to an ATM-SAR protocol, a transmitting node in a network segments a message into data packets, encodes the data packets into ATM cells, and then transmits the ATM cells asynchronously on a physical interface (wires or optical cable) of the network. A receiving node in the network receives and reassembles a message by identifying and collecting the ATM cells corresponding to the message. Available transmission time on the physical interface is divided into time slots or channels which can be assigned to different messages. Accordingly, the network can carry many simultaneously pending messages which must be handled by transmitting and receiving nodes.

A typical node in the network is a computer connected to the network's physical interface through hardware such as may be provided on an interface card connected between the network's physical interface and a local bus, such as an ICS, VESA, or PCI bus, in the computer. To transmit a message, the computer executes a program that allocates a buffer in main memory, fills the buffer with a message to be transmitted, and writes the buffer's address to the interface card. The interface card segments the message into ATM cells, and transmits the ATM cells in a channel allocated for the message. To receive a message, the computer executes a program that allocates a buffer in main memory and transmits the address of the buffer to the interface card. The interface card receives and identifies ATM cells for the message and reassembles the messages by writing data from the ATM cells into the buffer in main memory.

An interface card can include local memory for storing information describing the channels and ATM cells used during segmentation and reassembly. Increasing the amount of local memory increases the channel capacity and cost of the interface card. Accordingly, an ideal local memory size depends on the application of the SAR circuit. SAR circuits which requires a fixed amount of local memory may have too little memory for some applications and may have too much memory (and therefore be too expensive) for other applications. Having several different SAR circuits, each of which uses a different size memory, better meets the varied requirements of applications but also increases development, production, and stocking costs of providing the SAR circuits.

In an SAR circuit with a configurable memory interface, hardware and/or software unique to the application configures the memory interface to generate only addresses within the available local memory. This allows the SAR circuit to uses local memory having a size selected for the application of the SAR circuit. Configurable memory interfaces have the disadvantages of increasing the complexity and cost of SAR circuits.

SUMMARY OF THE INVENTION

In accordance with this invention, an asynchronous transfer mode (ATM) segmentation and reassembly (SAR) circuit uses a memory interface and a fixed memory map to accommodate several different memory sizes. Address signals are generated according to the fixed memory map without changes for memory size. Thus, circuits and software which generate address signals can use different amounts memory without being altered or reconfigured. The memory interface has an address port with sufficient address terminals for connection to a memory having a size equal to the size of the memory map. Memories smaller than the memory map use only the address terminals which carry the least significant bits of the address signals from the memory interface.

One memory map in accordance with an embodiment of the invention allocates N-bit addresses to buffers and an expansion area. The most significant bits of the N-bit addresses are unused or ignored for memories with fewer than N address terminals. To avoid address conflicts when the most significant bits are ignored, a first set of buffers has addresses with the i+1 most significant bits set to 1 and a second set of buffers has addresses with the i+1 most significant bits set to 0. Up to i most significant address bits can be ignored without causing address conflicts between the first and second sets of buffers because addresses for the first set of buffers always have at least one bit that differs from addresses for the second set of buffers.

The expansion area is between the first and second set of buffers and shrinks for smaller memories. For application using the smallest memory, there is no expansion area. Conflicts are avoided because, in an application having a small number of channels, the size of the buffers is large enough that the SAR circuit never generates address signals corresponding to the expansion area. With larger memory, buffers adjacent the expansion area can expand into the expansion area without causing address conflicts. In one embodiment of an SAR circuit in accordance with the invention, buffers adjacent the expansion area contain transmit channel descriptors and a receive connection table. The required size of these buffers depends on the number of channels available in a network, and SAR circuits connected to networks having a larger number of channels use larger memories expand the buffers.

One embodiment of the invention is a circuit including: an address port having N address terminals, wherein the number of terminals connected to a memory depends on the size of the memory; and an address signal generator which generates address signals representing N-bit addresses, wherein a first continuous range of N-bit addresses corresponds to a first buffer and contains a highest address with most significant bits set to 1, and a second continuous range of N-bit addresses correspond to a second buffer and contains a lowest address with most significant bit set to 0.

DETAILED DESCRIPTION OF THE PREFERRED EMBODIMENTS

Figure 1:
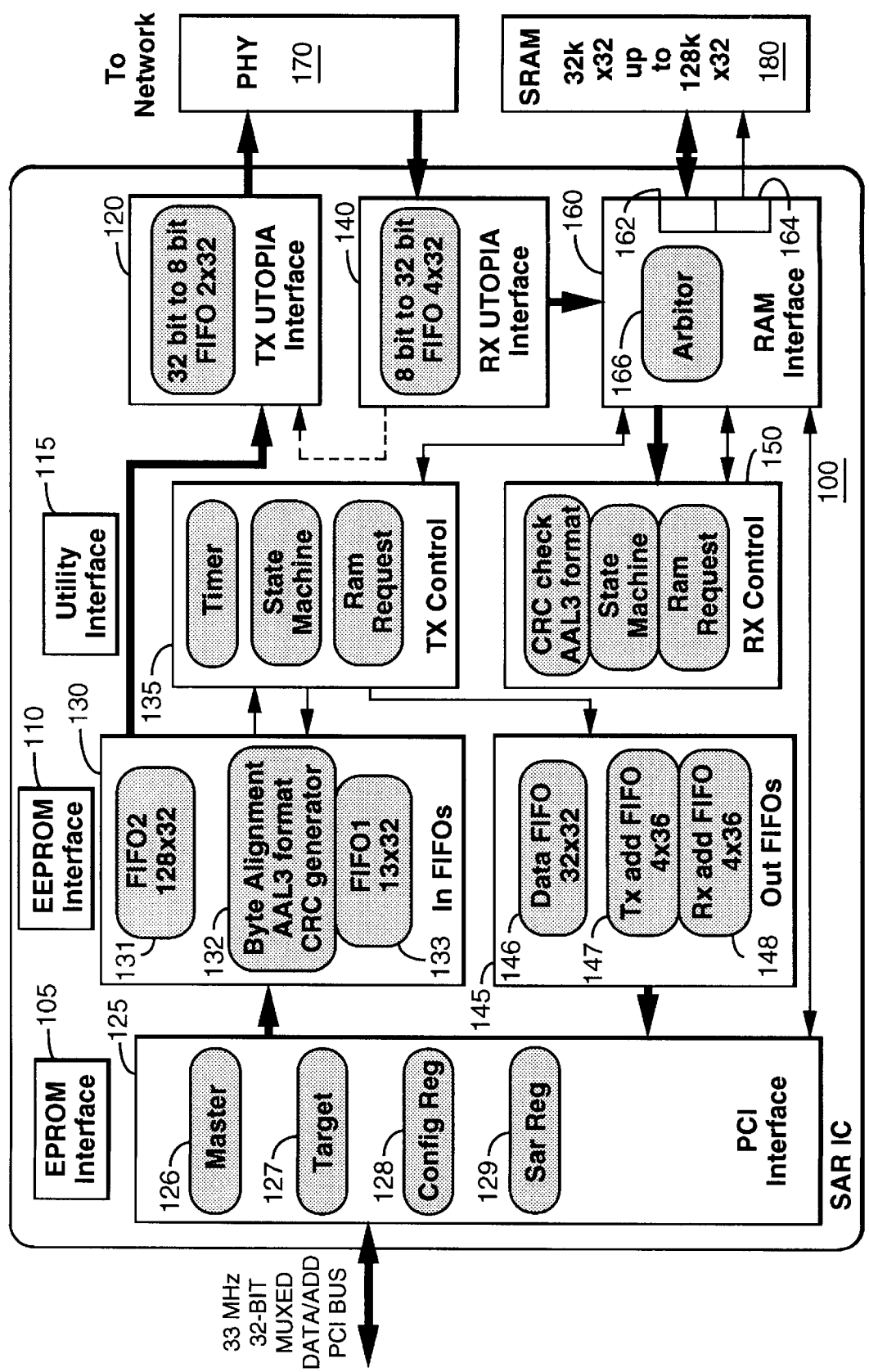
FIG. 1 shows a system which performs segmentation and reassembly of asynchronous transfer mode messages, in accordance with an embodiment of the invention.

FIG. 1 shows an embodiment of this invention which includes a segmentation and reassembly (SAR) integrated circuit (IC) 100 having a memory interface 160. Memory interface 160 accesses an external memory 180 in a conventional manner such as asserting a multi-bit address signal through an address port 164, asserting a read or write signal, and sensing or asserting a multi-bit data signal through data port 162. The value represented by the address signal depends on hardware operation and the execution of firmware or software in SAR IC 100. Address port 164 has multiple terminals, each of which carries a bit of the address signal. Whether an application of SAR IC 100 requires all of the bits of the address signal depends on the size of memory 180.

In three example embodiments, address port 164 has seventeen terminals for a 17-bit address signal, and memory 180 is a 128k×32-bit, 64k×32-bit, or 32k×32-bit memory with a 17-bit, 16-bit, or 15-bit address port, respectively. If memory 180 is a 128k×32-bit memory, memory interface 160 uses all seventeen bits of the address signal to access memory 180, and all seventeen terminals of address port 164 are coupled to the address port of memory 180. If memory 180 is a 64k×32 bit memory, only sixteen terminals of address port 164 are coupled to the address port of memory 180, and memory interface 160 asserts only the sixteen least significant bits of the address signal to memory 180. If memory 180 is a 32k×32-bit, memory interface 160 uses fifteen of the terminals of address port 164 and the fifteen least significant bits of the address signal to access memory 180. In the three examples, memory 180 stores a 32-bit word at each address, but any other size words such as 8-bit, 16-bit, or 64-bit words may be employed.

Software, firmware, and/or hardware in SAR IC 100 uses external memory 180 for data storage while segmenting or reassembling messages transmitted as ATM cells. In particular, SAR IC 100 requires buffers to store information used during segmentation and reassembly. The term buffer as used herein includes data buffers, FIFOs, stacks, and data tables. Although the functions of SAR IC 100 do not changed in different applications, some applications require the ability to handle more or fewer channels, and the required sizes of some of the buffers depend on the number of channels. Applications of SAR IC 100 which process more channels require memory 180 to be larger.

SAR IC 100 generates the same address signals regardless of the size of memory 180. Accordingly, SAR IC 100 does not require complicated circuitry, firmware, or software to determine how address signals change for the available memory. If an address port of memory 180 has fewer terminals than address port 164 has, terminals carrying the least significant bits of the address signals from memory interface 160 are coupled to memory 180, and the most significant bits are not used. A memory map in accordance with an embodiment of this invention avoids address conflicts which could otherwise result from ignoring the most significant bits of the address signal.

Figure 2:
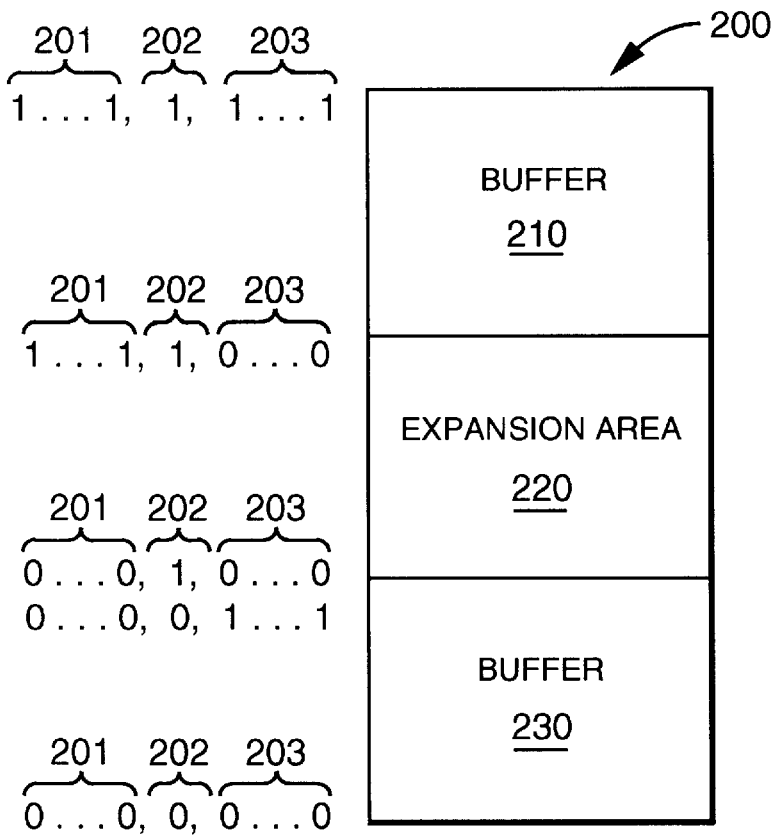
FIGS. 2 and 3 respectively show embodiments of memory maps in accordance with this invention.

FIG. 2 shows a memory map 200 of addresses generated by memory interface 160. Memory map 200 divides an N-bit address space into addresses for buffers 210 and 230 and an expansion area 220. Typically, buffer 210 or 230 is partitioned into a set of smaller buffers such as described below in regard to FIG. 3. Buffers 210 and 230 fit in the minimum size for memory 180 and are sufficient for an application requiring a minimum number of channels. In applications which have more memory, buffer 210 and/or buffer 230 can expand into expansion area 220. Expansion area 220 can also store a variable sized buffer which does not have a minimum required size.

Each N-bit address of memory map 200 has three fields 201, 202, and 203. Field 201 contains the i most significant bits of the N-bit address, field 203 contains the j least significant bits of the N-bit address, and field 202 contains a single bit which is between field 201 and 203 (N=i+1+j). Buffer 210 has a range of N-bit addresses with the bits in fields 201 and 202 set to 1. Buffer 230 has a range of N-bit addresses with the bits fields 201 and 202 set to 0. Expansion area 220 is between buffer 210 and buffer 230.

Memories having address ports from N to j+1 bits wide can use memory map 200. If the address port of the memory is less than N bits wide, one or more of the most significant bits in field 201 are not used, and if the address port of the memory is j+1 bits wide, the entire field 201 is ignored. Address conflicts between buffer 210 and buffer 230 are avoided because field 202 is 1 for addresses in buffer 210 but field 202 is 0 for addresses in buffer 230. More generally, address conflicts are avoided if the j+1 least significant bits of addresses for buffer 210 differ from the j+1 least significant bits of addresses for buffer 230.

In an embodiment where a memory has a j+1 bit address space, expansion area 220 is not present. Larger memories are used in applications that require expansion area 220, for example, in applications where buffer 210 or 230 needs to be larger than the space provided by memory map 200.

Figure 3:
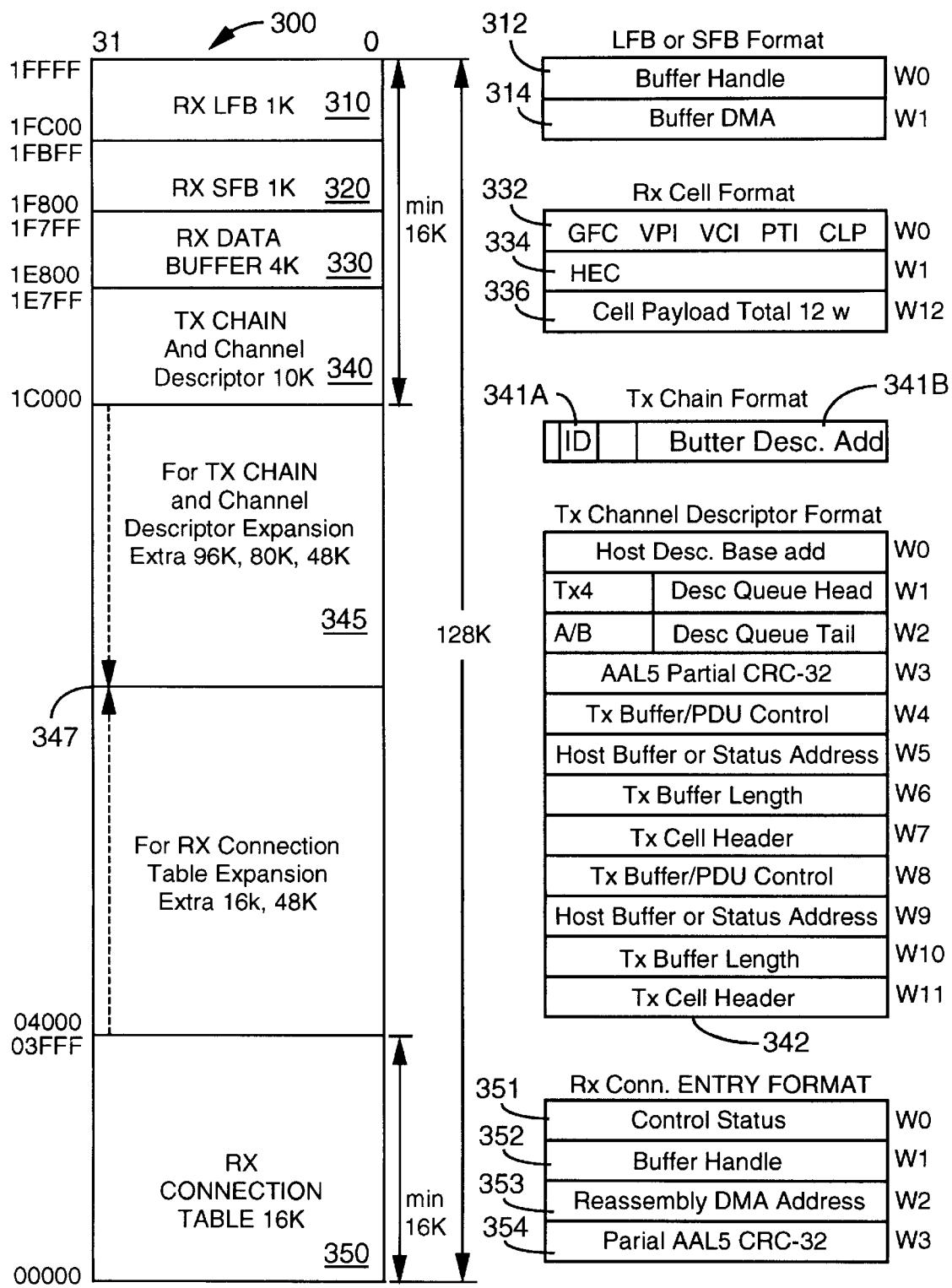

FIG. 3 shows an example memory map 300 of 17-bit addresses which divide memory 180 (FIG. 1) into buffers 310, 320, 330, 340, 345, and 350. The 17-bit addresses have a field containing two most significant bits (bits 16 and 15), a field containing fourteen least significant bits (bits 13 to 0), and a field between the other two fields (bit 14). Addresses for buffers 310 to 340 have three most significant bits (bits 16 to 14) set to one. Addresses for buffer 350 have three most significant bits set to zero.

Buffers 310, 320, 330, 340, 345, and 350 are described in conjunction with the system shown in FIG. 1. A receiving large free buffer 310 is a fixed size buffer (1k of 32-bit words) which is at 17-bit addresses from 1FC00h to 1FFFFh (hexadecimal). Receiving large free buffer 310 contains up to 512 entries each of which describes a large buffer (2k to 16k bytes) in the main memory of the host computer connected to SAR IC 100 via a local bus and a PCI interface 125. Each entry in receiving large free buffer 310 contains a buffer handle 312 indicating a starting address of the large buffer, and a direct memory access (DMA) address of the large buffer. PCI interface 125 can read or write data to main memory of the host computer via a standard PCI bus which is a 32-bit time multiplexed address/data bus.

PCI interface 125 can also access optional EPROM and/or EEPROM (not shown) via an EPROM interface 105 or an EEPROM interface 110. EPROM and EEPROM are typically employed for boot data such as the device addresses for SAR circuit 100. Such PCI interfaces are known in the art and not critical to this invention.

A receiving small free buffer 320 is another fixed size buffer (1k of 32-bit words) at 17-bit addresses from 1F800h to 1FBFFh. Receiving small free buffer 320 contains up to 512 entries, each of which describes a small buffer (64, 128, or 256 bytes) in the main memory of the host. Each entry contains a buffer handle 312 indicating a starting address of the small buffer, and a DMA address for the small buffer.

A receiving data buffer 330 is a fixed sized buffer containing 4k of 32-bit words between 17-bit addresses 1E800h and 1F7FFh. SAR IC 100 temporarily stores in receiving data buffer 330 ATM cells which are received from a physical interface of the network via a physical protocol device 170. Physical protocol device 170 may be, for example a PM5346 IC available from PMC-Sierra, Inc. of Burnaby, BC Canada or an IDT77105 IC available from Integrated Device Technology, Inc. of San Jose. A utility interface 115 initializes and configures physical protocol device 170.

An RX UTOPIA interface 140 contains a 8-bit to 32-bit FIFO which receives byte values from physical protocol device 170 and converts four byte values into a 32-bit word which memory interface 160 writes to receiving data buffer 330. Each ATM cell is saved in receiving data buffer 330 as a first 32-bit word 332 containing a header of the ATM cell, a second 32-bit word 334 containing an 8-bit header error check code, and twelve 32-bit words 336 containing a 48-byte cell payload. The format of ATM cells is well known in the art and described in the "ATM User-Network Interface Specification" which was incorporated by reference above. Once an ATM cell is in receiving data buffer 330, RX control unit 150 checks CRC bytes for the ATM cell payload 336 and compares the header of the ATM cell with information in buffer 350, also referred to as RX connection table 350.

RX connection table 350 contains 4-word entries. Each entry contains a 32-bit control status word 351 which identifies a channel. The number of entries in buffer 350 depends the number of allocated channels. Buffer 350 has a lower boundary at 17-bit address 00000h, extends upward to 17-bit address 03FFFh, and can expand upward into expansion area 345 if the size of memory 180 permits.

If an entry in buffer 350 corresponds to the ATM cell in RX data buffer 330, RX control unit 150 writes a DMA address 353 from the RX connection entry to a receiving address FIFO 148 and writes cell payload 336 to a data FIFO 146. PCI interface 125 writes the cell payloads from data FIFO 146 to the host main memory at DMA addresses indicated by RX address FIFO 148.

Buffer 340 contains a transmit chain and transmit channel descriptors. The transmit chain is a series of 32-bit words, one word for each channel. Each word in the transmit chain contains an ID field 341A which identifies a channel and a channel descriptor address 341B which points to a channel descriptor in buffer 340 or expansion area 345. Each channel descriptor 342 corresponds to a channel and includes an ATM cell header for an ATM cell transmitted on the channel, a buffer length indicating the amount of data to be transmitted from a buffer, the address of the buffer containing data to transmit, a pointer to a channel descriptor for the preceding channel in the transmit chain, and a pointer to a channel descriptor for the next channel in the transmit chain. The number of channel descriptors and therefore amount of memory required for buffer 340 depends on the number of channels. Buffer 340 has an upper boundary at 17-bit address 1E7FFh, extends downward to 17-bit address 1C000h, and can expand into expansion area 345 if the size of memory 180 permits.

A TX control unit 135 begins transmission of an ATM cell by writing an address from a channel descriptor to a TX address FIFO 147. The transmit chain in buffer 340 indicates the order in which addresses are written to TX FIFO 147. PCI interface 125 retrieves an address from TX FIFO 147 and transfers 48 bytes of data from the address in main memory to a FIFO 131. A formatting unit 132 writes an ATM cell header to FIFO 133 and converts data from FIFO 131 to an ATM cell payload. Formatting unit 132 performs byte alignment, AAL3 formatting (if necessary), and CRC byte generation as required to generate the ATM cell and writes the ATM cell payload to FIFO 133. When physical protocol device 170 indicates the channel allocated for the ATM cell is available, a transmit UTOPIA interface 120 converts the 32-bit words from FIFO 133 into bytes which are transmitted through physical protocol device 170.

The host computer reads and writes values in buffers 310, 320, 330, 340, and 350 via PCI interface 125 and memory interface 160. Typically, the host computer would access memory 180 to change the channel descriptors or add entries to RX connection table 350. Memory interface 160 contains an arbitor 166 which arbitrates memory access requests from PCI interface 125, RX control unit 150, TX control unit 135, and RX UTOPIA interface 140.

If memory 180 has 17-bit or larger address port, the addresses shown in FIG. 3 define the boundaries of buffers 310, 320, 330, 340, 345, and 350 in memory 180. If memory 180 has an address port that is smaller than 17-bits, the boundaries of buffers 310, 320, 330, 340, 345, and 350 in memory 180 are determined by ignoring the most significant bits of the 17-bit addresses shown in FIG. 3. For example, if memory 180 has a 15-bit or 16-bit address space, only the fifteen or sixteen least significant bits of the 17-bit address signals are used.

Table 1 shows the boundaries of buffers 310, 320, 330, 340, 345, and 350 in three example embodiments where memory 180 has a 17-bit, 16-bit, or 15-bit address space.

TABLE 1

| Buf | 17-bit Address Boundaries | 16-bit Address Boundaries | 15-bit Address Boundaries |
|-----|---------------------------|---------------------------|---------------------------|
| 310 | 1FC00 to 1FFFFh | FC00 to FFFFh | 7C00 to 7FFFh |
| 320 | 1F800 to 1FBFFh | F800 to FBFFh | 7800 to 7BFFh |
| 330 | 1E800 to 1F7FFh | E800 to F7FFh | 6800 to 77FFh |
| 340 | 1C000 to 1E7FFh | C000 to E7FFh | 4000 to 67FFh |
| 345 | 04000 to 1C000h | 4000 to BFFFh | Not Available |
| 350 | 00000 to 3FFFh | 0000 to 3FFFh | 0000 to 3FFFh |

As shown in Table 1, the 17-bit addresses 0000h to 03FFFh and 1C000h to 1FFFFh for buffers 310, 320, 330, 340, and 350 are in one-to-one correspondence with 16-bit addresses 0000h to 3FFFh and C000h to FFFFh and in one-to-one correspondence with 15-bit addresses 0000h to 7FFFh. However, memory map 300 of FIG. 3 and Table 1 cannot be used with memories having address ports smaller than 15-bits because of address conflicts. For example, address 17-bit addresses 1FFFFh and 03FFFh both correspond to the 14-bit address 3FFFh, and using 14-bit addresses, memory interface 160 cannot distinguish data in receiving large free buffer 310 from data in receiving connection table 350.

Expansion area 345 has a similar problem in that some or all of the 17-bit addresses from 04000h to 1BFFFh overlap and are indistinguishable from the 16-bit and 15-bit addresses of buffers 310, 320, 330, 340, and 350. In accordance with embodiments of this invention, memory interface 160 uses expansion area 345 in a way that avoids the problems with overlapping addresses.

If memory 180 has a 17-bit address space for 128k addresses, there is no possibility of an address conflict caused by ignoring most significant bits because no bits are ignore. However, a boundary value 347 can set lower or upper limits to expansion (or size) of buffer 340 or buffer 350.

If memory 180 has 15-bit address space for 32k addresses, 17-bit address 1C000h corresponds to 15-bit address 4000h and 17-bit address 03FFFh corresponds to 15-bit address 3FFFh. Accordingly, buffer 340 and 350 are contiguous in memory 180, and expansion area 345 is not present. Memory interface 160 does not generate 17-bit addresses between 04000h and 1C000h because expansion of buffers 340 or 350 is not required in the applications of SAR IC 100 using a small number of channels.

If memory 180 has 16-bit address space for 64k of addresses, 17-bit addresses 1C000h and 3FFFh correspond to 16-bit addresses C000h and 3FFFh, and area 345 is between 16-bit addresses 3FFFh and C000h. A total expansion of 32k words can occur in buffers 340 and 350 before an address conflict occurs. Memory interface 160 generates addresses for new entries in RX connection table 350 by incrementing from a base address. The first entry which expands into expansion area 245 has 17-bit address 04000h (16-bit address 4000h). Memory interface 160 generates addresses for buffer 340 by decrementing from a base address. A first channel descriptors in expansion area 345 is at an address below 17-bit address 1C000h (16-bit address C000h). Conflicts cannot occur until the combined expansion of buffers 340 and 350 reaches 32k of words. Generally, the size of buffer 340 is complementary to the sizes of buffer 350 because buffer 340 increases in size as the number of channels used for transmissions increases and buffer 350 decreases in size as the number of channels available for receiving decreases.

Limiting the number of channels on the network limits the maximum size of buffer 340 because the number of channel descriptors in buffer 340 is less than or equal to the maximum number of channels. The size of buffer 350 is also proportional to the number of channels. Accordingly, when memory 180 has a size selected for the number channels used in the network, address conflicts are avoided by inherent size limits on buffers 340 and 350.

Rather than relying on inherent size limits for buffers 340 and 350, SAR IC 100 can also use boundary value 347 to restrict expansion of one of the buffers 340 or 350. For example, a non-volatile memory programmed during manufacture or a configuration register 128 initialized by software executed at start-up can configure boundary value 347 to limit expansion of buffer 350. The number of entries in buffer 350 and therefore the 17-bit addresses generated to access buffer 350 are restricted by boundary value 347. For example, the boundary can be set to allow buffer 350 to expand by 0k or 16k (i.e. limit the receiving connection table to 17-bit addresses less than 03FFFh or 07FFFh).

Buffers 340 and 350 are selected for expansion because buffers 340 and 350 have the largest entries and increase in size the most when the number of channels increases. Buffers 310, 320, and 330 having smaller entries have are sufficient for the maximum number of channels. Buffers 340 and 350 have sizes suitable for the minimum number of channels and are increased in size by using a larger memory 180 and expansion area 345.

Although the invention has been described with reference to particular embodiments, the description is only an example of the invention's application and should not be taken as a limitation. In particular, although much of the above disclosure was directed to an SAR IC which is adaptable to different memory sizes, other digital systems can also benefit from memory interfaces in accordance with this invention. Various other applications, adaptations, and combinations of features of the embodiments disclosed will be apparent to those skilled in the art and are within the scope of the present invention as defined by the following claims.

We claim:

1. A circuit comprising;
    a SAR circuit which comprises:
        an address port having N address terminals, wherein the address port is operable for connection to a memory having any one of a plurality of different sizes and wherein all N address terminals are used for connection to a memory of a first size, and a number M of the N address terminals are used for connection to a memory of a second size smaller than the first size, N being a number greater than M, and
    an address signal generator which generates an N-bit address signal that is applied to the address port to identify a storage location, wherein the N-bit address signal has possible values including a first continuous range of N-bit addresses that corresponds to a first buffer and contains a highest address with N-M most significant bits set to 1, and a second continuous range of N-bit addresses that corresponds to a second buffer and contains a lowest address with N-M most significant bits set to 0, and
    a memory of the second size coupled to the address signal generator through M address terminals of the address port, wherein the memory comprises the first and second buffers, and the memory receives M least significant bits of the N-bit address signal generated by the address signal generator.

2. The circuit of claim 1, wherein the first buffer stores information describing channels of an asynchronous transfer mode network.

3. The circuit of claim 1, wherein the first buffer stores information describing channels for transmitting ATM cells on an asynchronous transfer mode network.

4. The circuit of claim 3, wherein the second buffer stores information describing channels for receiving ATM cells from the asynchronous transfer mode network.

5. A method for accessing buffers, comprising:
    allocating a first range of N-bit addresses to a first buffer, wherein each N-bit address in the first range has i most significant bits set to 1, and wherein N and i are integers greater than 0;
    allocating a second range of the N-bit addresses to a second buffer wherein each N-bit address in the second range has i most significant bits set to 0;
    allocating a third range of N-bit addresses for expansion of the second buffer, wherein the third range of addresses is contiguous with the second range and extends to addresses higher than the addresses in the second range;
    connecting a memory interface having an N-bit address port to a memory having an M-bit address port, wherein M is an integer less than N;
    accessing the first buffer by asserting a first M-bit address signal from M least significant bits of the N-bit address port to the memory wherein the first M-bit address signal represents the M least significant bits of an N-bit address in the first range;
    accessing the second buffer by asserting a second M-bit address signal from the M least significant bits of the N-bit address port to the memory, wherein the second M-bit address signal represents the M least significant bits of an N-bit address in the second range; and
    accessing the second buffer by asserting a third M-bit address signal to the memory, wherein the third M-bit address signal represents the M least significant bits of an N-bit address in the third range.

6. A method for accessing buffers, comprising:
    allocating a first range of N-bit addresses to a first buffer, wherein each N-bit address in the first range has i most significant bits set to 1, and wherein N and i are integers greater than 0;

allocating a second range of the N-bit addresses to a second buffer, wherein each N-bit address in the second range has i most significant bits set to 0;

allocating a third range of N-bit addresses for expansion of the first buffer, wherein the third range of addresses is contiguous with the first range and extends to addresses lower than the addresses in the first range;

connecting a memory interface having an N-bit address port to a memory having an M-bit address port wherein M is an integer less than N;

accessing the first buffer by asserting a first M-bit address signal from M least significant bits of the N-bit address port to the memory, wherein the first M-bit address signal represents the M least significant bits of an N-bit address in the first range:

accessing the second buffer by asserting a second M-bit address signal from the M least significant bits of the N-bit address port to the memory, wherein the second M-bit address signal represents the M least significant bits of an N-bit address in the second range; and accessing the first buffer by asserting a third M-bit address signal to the memory, wherein the third M-bit address signal represents the M least significant bits of an N-bit address in the third range.

7. The method of claim 6, further comprising:

allocating a fourth range of N-bit addresses for expansion of the second buffer, wherein the fourth range of addresses is contiguous with the second range and extends to addresses higher than the addresses in the second range; and accessing the second buffer by asserting a fourth M-bit address signal to the memory, wherein the fourth M-bit address signal represents the M least significant bits of an N-bit address in the fourth range.

* * * * *